(12) United States Patent
Nolan

(10) Patent No.: US 12,460,253 B2
(45) Date of Patent: Nov. 4, 2025

(54) SPATIALLY ORIENTED QUANTUM BARCODING OF CELLULAR TARGETS

(71) Applicant: Roche Sequencing Solutions, Inc., Pleasanton, CA (US)

(72) Inventor: Garry P. Nolan, Redwood City, CA (US)

(73) Assignee: ROCHE SEQUENCING SOLUTIONS, INC., Pleasanton, CA (US)

( * ) Notice: Subject to any disclaimer, the term of this patent is extended or adjusted under 35 U.S.C. 154(b) by 1189 days.

(21) Appl. No.: 17/295,020

(22) PCT Filed: Dec. 4, 2019

(86) PCT No.: PCT/US2019/064431
§ 371 (c)(1),
(2) Date: May 18, 2021

(87) PCT Pub. No.: WO2020/117914
PCT Pub. Date: Jun. 11, 2020

(65) Prior Publication Data
US 2021/0395805 A1    Dec. 23, 2021

Related U.S. Application Data

(60) Provisional application No. 62/775,234, filed on Dec. 4, 2018.

(51) Int. Cl.
*C12Q 1/6841* (2018.01)
(52) U.S. Cl.
CPC .................. *C12Q 1/6841* (2013.01)
(58) Field of Classification Search
None
See application file for complete search history.

(56) References Cited

U.S. PATENT DOCUMENTS

| | | | | |
|---|---|---|---|---|
| 2016/0251697 A1* | 9/2016 | Nolan | ............. | C12Q 1/686 506/2 |
| 2016/0253584 A1* | 9/2016 | Fodor | ............. | C12Q 1/6813 235/494 |
| 2016/0289740 A1* | 10/2016 | Fu | ............. | C12Q 1/6837 |

FOREIGN PATENT DOCUMENTS

| WO | WO 2011/127099 A1 | 10/2011 |
|---|---|---|
| WO | 2015128272 A2 | 9/2015 |
| WO | WO 2017/015097 A1 | 1/2017 |
| WO | 2018138237 A1 | 8/2018 |

OTHER PUBLICATIONS

Agasti et al, "Photocleavable DNA Barcode-Antibody Conjugates Allow Sensitive and Multiplexed Protein Analysis in Single Cells", Journal of the American Chemical Society, 2012, pp. 18499-18502, vol. 134.
Goltsev, et al., Resource, Deep profiling of Mouse Splenic Architecture with CODEX Multiplexed Imaging, 2018.
International Search Report and Written Opinion for PCT/US19/64431 filed Dec. 4, 2019, Issued Feb. 24, 2020.

* cited by examiner

*Primary Examiner* — Samuel C Woolwine
*Assistant Examiner* — Carolyn L Greene
(74) *Attorney, Agent, or Firm* — James S. Keddie; Bozicevic, Field & Francis LLP

(57) ABSTRACT

The invention is a method of simultaneously detecting the presence and spatial location of a target in a tissue sample by attaching an anchor to the target and assembling unique positional barcodes on the anchor. The method enables analyzing cellular targets in 3D.

24 Claims, 5 Drawing Sheets

1-1
2-2
2-1
1-2

1-1-1, 1-1-2, etc...

SPATIALLY ORIENTED QUANTUM BARCODING OF CELLULAR TARGETS

FIELD OF THE INVENTION

The invention relates to the field of tissue staining and molecular pathology and more specifically, to the field of labeling and barcoding cellular targets within a three-dimensional tissue sample.

BACKGROUND OF THE INVENTION

Appropriate tissue function requires spatial positioning and orientation of cells. Cells contacts allow passage of information from one cell to another in expected manners. Diseased tissue can often be characterized by incorrect spatial localization of cells, or destruction of certain cell types required for the development and function of other cells. Technologies which enable 2D and 3D spatial localization provide information that can be used to understand normal function of cells and cellular components, and why the absence of such function leads to clinical manifestations of disease. Currently the primary means of obtaining spatial (2D or 3D) information for a tissue, a biofilm or cells requires microscopic examination of cells to which labeled antibodies or other types of probes have been bound. Time, cost and the availability of labeled reagents is a significant obstacle to high throughput imaging of biological samples. The number of distinguishable fluorescent labels is very limited: usually 3 or 4 at a time and up to 40 or 50 by iterative staining. Isotope labeling allows up to 40 options albeit at a very high cost. Technologies that use fluorophores and isotopes for cell imaging are still being developed. However, taking advantage of the use of nucleic acid sequence tags or chemical adducts (detected by mass spectrometry) can take spatial analysis to a new level. The use of these labels can potentially allow for imaging of tissues or cells without a microscope. This takes imaging out of the realm of microscopy and into the realm of tagging and spatial identification. The present invention is a method with an essentially limitless number of labels (codes) that can be generated at little cost for both nucleic acid and protein targets in a tissue or another 2D or 3D sample.

SUMMARY OF THE INVENTION

Figure 1:
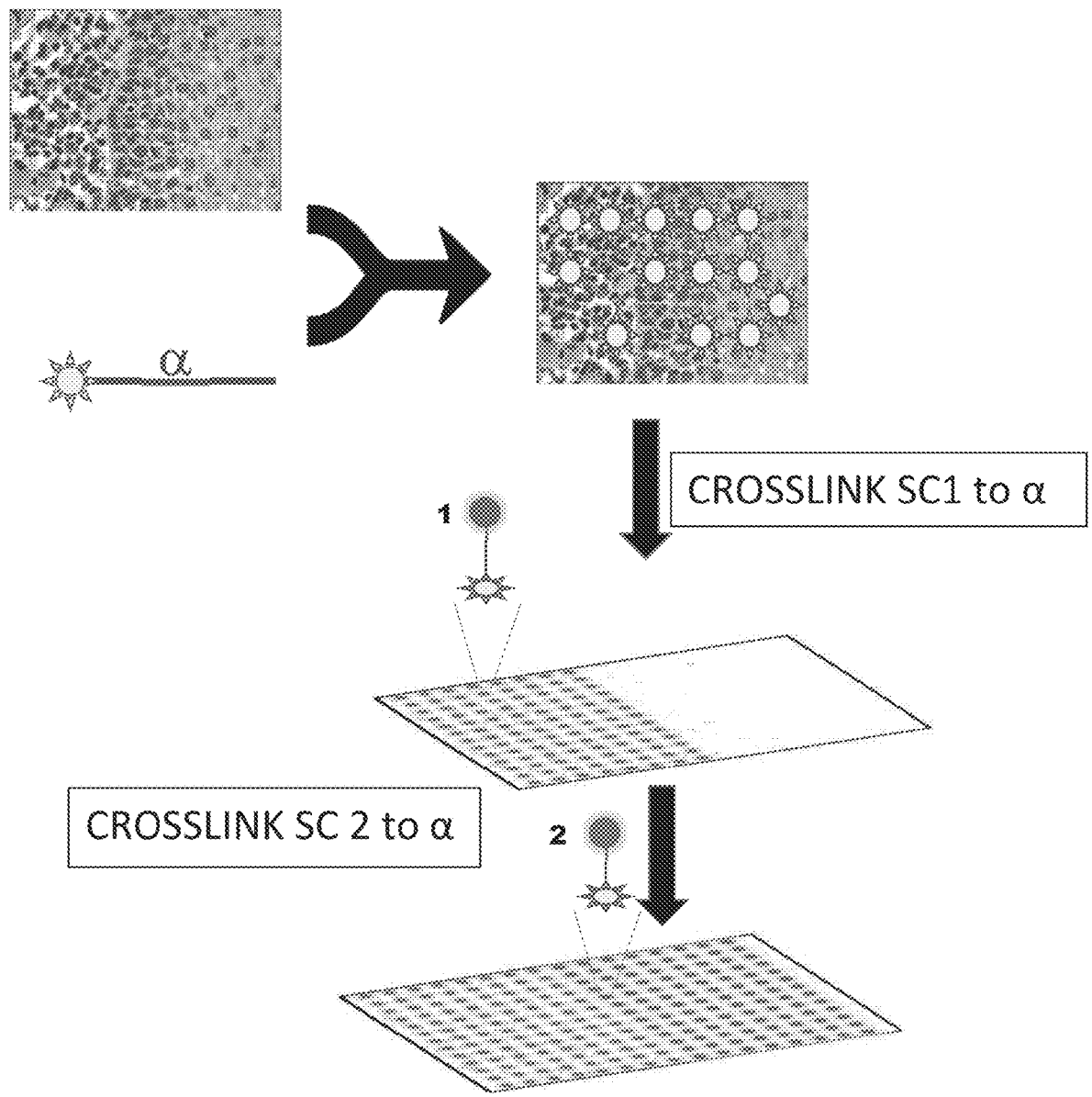
FIG. 1 illustrates a workflow for detecting the presence and location of targets in a tissue sample.

The invention is a method of labeling and detecting targets in 2D surface or 3D space. The method assembling a unique nucleic acid or mass barcode on each target in the sample. The unique barcode encodes both the identity of the target and its location. To assemble each barcode from subcodes, a portion of the sample is irradiated allowing the subcode to attach to only a portion of the sample. The sample is subdivided into as many regions as necessary so that each region has a unique barcode associated with it. Barcodes can be read by sequencing or mass-spectrometry and interpreted.

In some embodiments, the invention is a method of simultaneously detecting the presence and spatial location of a target in a tissue sample, the method comprising: covalently attaching an anchor to a target in the tissue sample via a reactive group; on the anchor, assembling a code from a set of subcodes by a method comprising: contacting the sample with a first subcode and allowing the first subcode to covalently attach to the anchor in a first portion of the tissue sample forming a code thereon; contacting the sample with a second subcode and allowing the second subcode to covalently attach to the anchor in a second portion of the tissue sample non-overlapping with the first portion, forming a code thereon; repeating the pair of steps i-ii one or more times, wherein in each repetition, the portion of the tissue sample contacted in the first step is non-overlapping with the portion of the tissue sample contacted in the second step; and the added subcodes attach to the existing subcodes and extend the existing code thereby forming codes marking each portion of the tissue sample; and reading the codes assembled on the anchor in step iii. thereby detecting the presence of the target and its location in the tissue sample. Only two or more than two subcodes can be used in code assembly steps.

In some embodiments, the anchor is a nucleic acid which can comprise one or more of a poly-A binding sequence, a random sequence and a target-specific sequence. In some embodiments, the anchor is an aptamer.

Subcodes may also be nucleic acids. In some embodiments, the anchor is covalently attached to the target via crosslinking. Subcodes can also be covalently attached to the anchor and other subcodes via crosslinking. In some embodiments, prior to covalent attachment, the subcodes hybridize to the anchor and to the other subcodes via regions of complementarity to the anchor and the other subcodes. The non-crosslinked subcodes may be removed, e.g., by a wash in a solution comprising one or more of a salt buffer, a detergent, and a solvent. Crosslinking may be by irradiation by radiation selected from sonic radiation, photobeam (laser), a terahertz-frequency beam, X-rays. The laser may be operated by a computer executing a code referencing a time of irradiation with the portion of the tissue sample being irradiated and the sequence of the subcode contacting the tissue sample at that time.

In some embodiments, the subcodes attach to the anchor and the other subcodes via sonic irradiation that facilitates a chemical reaction.

In some embodiments, the target is a protein. The reactive group in the anchor may be thymidine attached to the target protein via thymidine-lysine addition.

In some embodiments, the subcodes attach to a common linker or to existing subcodes via an annealing primer. The subcodes may be covalently linked by ligation which may be preceded by strand extension by a polymerase, e.g., an error prone polymerase or Taq polymerase in the presence of manganese ions.

In some embodiments, reading the code comprises amplifying the code and sequencing the code. In some embodiments reading the code comprises binding of a specific antibody to the target wherein the antibody is connected to a primer for reading the code. The antibody and the primer may be connected by virtue of being attached to the same solid support. The reading may utilize a primer at least partially complementary to the anchor or to the last subcode.

In some embodiments, multiple anchors comprising different reactive groups are attached to the tissue sample. The anchor may comprise a reactive group that reacts with the target in the presence of electric field. The subcodes may comprise non-nucleotide entities so the codes can be read by mass-spectrometry.

The assembled code may be a linear or a branched polymer.

In some embodiments, the tissue sample is embedded in a stabilization matrix, such as agarose or hydrogel or another matrix which transparent to the wavelength used in crosslinking.

In some embodiments, covalently attaching the subcode to the portion of the tissue sample comprises a step of masking the remainder of the tissue sample.

DETAILED DESCRIPTION OF THE INVENTION

Definitions

The following definitions aid in understanding this disclosure The term "sample" refers to any composition containing or presumed to contain a target to be analyzed. The term "tissue sample" refers to a sample having a three-dimensional structure. This includes a sample of a solid tissue isolated from an individual for example, organ or tumor biopsy. The term also includes an environmental sample, e.g., a microbial biofilm and also a sample of in vitro cultures established from cells taken from an individual, including the formalin-fixed paraffin embedded tissues (FF-PET).

The term "nucleic acid" refers to polymers of nucleotides (e.g., ribonucleotides and deoxyribonucleotides, both natural and non-natural) including DNA, RNA, and their subcategories, such as cDNA, mRNA, etc. A nucleic acid may be single-stranded or double-stranded and will generally contain 5'-3' phosphodiester bonds, although in some cases, nucleotide analogs may have other linkages. Nucleic acids may include naturally occurring bases (adenosine, guanosine, cytosine, uracil and thymidine) as well as non-natural bases. Some examples of non-natural bases include those described in, e.g., Seela et al., (1999) *Helv. Chim. Acta* 82:1640. The non-natural bases may have a particular function, e.g., increasing the stability of the nucleic acid duplex, inhibiting nuclease digestion or blocking primer extension or strand polymerization.

The terms "polynucleotide" and "oligonucleotide" are used interchangeably. Polynucleotide is a single-stranded or a double-stranded nucleic acid. Oligonucleotide is a term sometimes used to describe a shorter polynucleotide. Oligonucleotides are prepared by any suitable method known in the art, for example, by a method involving direct chemical synthesis as described in Narang et al. (1979) *Meth. Enzymol.* 68:90-99; Brown et al. (1979) *Meth. Enzymol.* 68:109-151; Beaucage et al. (1981) *Tetrahedron Lett.* 22:1859-1862; Matteucci et al. (1981) *J. Am. Chem. Soc.* 103:3185-3191. Oligonucleotides may also be prepared by the ink-jet printing method described in U.S. application Ser. No. 15/135, 434 "*Devices and methods for oligonucleic acid library synthesis*," filed on Apr. 21, 2016 or Ser. No. 15/015,059 "*Methods and devices for de novo oligonucleic acid assembly*," filed on Feb. 3, 2016.

The term "primer" refers to a single-stranded oligonucleotide which hybridizes with a sequence in the target nucleic acid ("primer binding site") and is capable of acting as a point of initiation of synthesis along a complementary strand of nucleic acid under conditions suitable for such synthesis.

The term "ligation" refers to a condensation reaction joining two nucleic acid strands wherein a 5'-phosphate group of one molecule reacts with the 3'-hydroxyl group of another molecule. Ligation is typically an enzymatic reaction catalyzed by a ligase or a topoisomerase. Ligation may join two single strands to create one single-stranded molecule. Ligation may also join two strands each belonging to a double-stranded molecule thus joining two double-stranded molecules. Ligation may also join both strands of a double-stranded molecule to both strands of another double-stranded molecule thus joining two double-stranded molecules. Ligation may also join two ends of a strand within a double-stranded molecule thus repairing a nick in the double-stranded molecule.

The term "code" as used herein refers to a sequence of two or more oligonucleotide or non-nucleotide entities ("subcodes") assembled on a target molecule and marking the target molecule in a sample. The term "subcode" as used herein refers to an oligonucleotide or a non-nucleotide entity that can be linked to other such entities to assemble a code. The term "barcode" and "nucleic acid barcode" refer to a code made up of nucleic acid. The barcode sequence can be detected and identified. Barcodes can be incorporated into various nucleic acids. Barcodes are sufficiently long e.g., 2, 5, 20 nucleotides, so that in a sample, the barcodes and nucleic acids incorporating them can be distinguished from each other.

The term "crosslinking" refers to a chemical reaction forming a covalent bond between two polymers that requires an external stimulus such as energy of a radiation of various wavelengths (heat, light, ultrasound) or a change in pH.

The term "quantum barcoding" or "QBC" refers to a process by which one or more targets in an individual cell in a mixture of cells can be labeled with a unique nucleic acid code. The process comprises the steps of stepwise assembly of unique codes from subcodes in situ on (or in) the cells or tissues. One example of QBC is described in the U.S. application Ser. No. 13/981,711 filed on Apr. 15, 2016.

The terms "target" and "target molecule" refer to the molecule of interest being detected or quantified by the methods described herein. The target can be a nucleic acid or a protein. The term target includes all variants of the target molecule, e.g., one or more mutant variants and the wild type variant. The term "target sequence" refers to a nucleic acid sequence in the sample which is to be detected or quantified.

The term "amplification" refers to a process of making additional copies of the target nucleic acid. Amplification can have more than one cycle, e.g., multiple cycles of exponential amplification. Amplification may have only one cycle (making a single copy of the target nucleic acid). The copy may have additional sequences, e.g., those present in the primers used for amplification. Amplification may also produce copies of only one strand (linear amplification) or preferentially one strand (asymmetric PCR).

The term "sequencing" refers to any method of determining the sequence of nucleotides in a nucleic acid.

The invention is a process to iteratively code positional information of targets in a two-dimensional or three-dimensional sample such that the contents of that region can be determined in a later analysis. Positional information can be encoded in the form of nucleic acid codes, e.g., DNA sequences that can be determined by conventional sequencing methods. Positional information can also be encoded in the form of chemical codes, e.g., as a sequence of chemical adducts that can be decoded by mass-spectrometry.

Currently the primary means of obtaining spatial (2D or 3D) information for a tissue, a biofilm or cells requires microscopic examination of cells to which labeled probes or antibodies have been bound. The number of distinguishable fluorescent labels is very limited: usually 3 or 4 at a time and up to 40 or 50 by iterative staining. Isotope labeling allows up to 40 isotopes albeit at a very high cost. The present invention is a method of spatially labeling the target with novel modular codes. The method provides an essentially limitless number of labels (codes) that can be detected in a single experiment. The method allows to detect DNA and qualitatively and quantitatively detect RNA and protein targets.

One alternative method of measuring the spatial distribution of targets (e.g., mRNA or proteins) involves annealing fixed tissue samples directly to an array of barcoded reverse-transcription (RT) primers and performing transcription followed by sequencing and computational reconstruction, see Stahl, P L et al. (2016) *Visualization and analysis of gene expression in tissue sections by spatial transcriptomics*, Science 353:78-82. A major drawback of that method is seepage, e.g., annealing of primers outside of their grid positions. The present invention overcomes this problem by utilizing a laser that can be focused on the desired area with a micron-level resolution.

A tissue sample used in the novel method is a fragment of tissue derived from an organism, a subject or a patient. In some embodiments the sample may comprise a fragment of a solid tissue or a solid tumor derived from the organism or the patient, e.g., by biopsy or surgical resection. In some embodiments, to facilitate the method of the invention, the tissue sample may be captured in an inert matrix (e.g., agarose gel matrix) see Andersson et al., (2006) *Analysis of protein expression in cell microarrays: a tool for antibody-based proteomics*, J. Histochem. Cytochem. 54(12): 1413-23. Epub 2006 Sep. 6). The tissue sample may also be imbedded in a hydrogel, which is a three-dimensional network composed of hydrophilic polymers crosslinked either through covalent bonds or held together via physical intramolecular and intermolecular attractions. See Hoffman A. S., (2001) *Hydrogels for biomedical applications*, Ann NY Acad Sci., 944:62-73. In some embodiments, hydrogel is a 3D structure composed of a network of polymers (e.g., acrylamide or bisacrylamide) linked to cellular molecules via formaldehyde. In some embodiments polymerization is initiated by addition of initiators into the tissue sample. See e.g., Chung, K., et al., (2013). *Structural and molecular interrogation of intact biological systems*. Nature, 497 (7449), 332. In some embodiments, after the polymerization process, non-protein molecules (e.g., lipids) are be washed away or eluted (e.g., by electrophoresis) leaving the target molecules (e.g., proteins and nucleic acids) in place. The gel or matrix must be transparent to the frequencies used for crosslinking or otherwise attaching the codes by the method further described below. In some embodiments, the matrix is not traversable to visible light but is traversable to other types of radiation used in the instant method.

In some embodiments, the tissue sample is preserved as a clinical patient sample according to the current medical practice. In some embodiments, the sample is fresh-frozen at −20° C. or below, e.g., at −80° C. In other embodiments, the clinical tissue sample is preserved by fixation with formalin and embedding in paraffin (FFPE). In such embodiments, the sample requires deparaffinization with heat or detergents according to the methods known in the art.

In some embodiments, the tissue sample is a microbial colony or biofilm. The only requirement is that the sample be transparent to the electromagnetic frequency of the radiation used to crosslink the codes as is discussed further below.

In some embodiments, the anchor is a nucleic acid specifically binding (hybridizing) to a nucleic acid target. In these embodiments, the anchor comprises a region of complementarity to the target nucleic acid (DNA or RNA). In some embodiments, to enable specific target recognition, the anchor is at least partially complementary to a nucleic acid target in the tissue sample. In some embodiments, the target is mRNA. In some embodiments, the anchor comprises a poly-T or poly-dT, poly-U or poly-dU sequence or any other homopolymer sequence capable of forming a stable hybrid with a poly-A sequence. In some embodiments, the anchor comprises a random sequence. In some embodiments, the anchor is a combination of two or more of a poly-A binding sequence, a random sequence and a target-specific sequence.

In some embodiments, the anchor is a nucleic acid aptamer selected for specifically binding to a non-nucleic acid target, see Oliphant, A R; et al., (1989) "*Defining the sequence specificity of DNA-binding proteins by selecting binding sites from random-sequence oligonucleotides: analysis of yeast GCN4 proteins*". Mol. Cell. Biol. 9 (7): 2944-2949. Methods of making and improving nucleic acid aptamers by a process termed SELEX are described e.g., in U.S. Pat. Nos. 5,475,096, 5,270,163, 5,567,588, 5,660,985, 5,580,737, 5,496,938, 9,382,533, 8,975,026, 8,975,388, 8,404,840, 7,964,356 and 7,947,447. Aptamers can be chemically linked to targets by a chemi-SELEX process as described in U.S. Pat. No. 5,705,337. Aptamers may comprise modified nucleotides with substitutions at ribose, phosphate and base positions (U.S. Pat. No. 5,580,737). Aptamers may be made to comprise photoreactive functional groups capable of binding and photocrosslinking to their targets (photo-SELEX), see U.S. Pat. Nos. 5,763,177, 6,001, 577, 6,291,184, 6,458,539 and 8,409,795.

The nucleic acid anchor further comprises a region of complementarity that allows code assembly on the anchor. In some embodiments, the region of complementarity is to a first subcode so that the first subcode anneals directly to the anchor and additional subcodes are added as described herein. In other embodiments, the region of complementarity is to an annealing primer that anneals to both the anchor and the first subcode and additional subcodes are added as described herein.

In some embodiments, the anchor is not complementary to a target, i.e., the target is a not a nucleic acid. In some embodiments, the anchor binds to all available targets in the tissue sample. For example, an anchor can be a nucleic acid that is attached to multiple or all proteins in the sample with no binding specificity. In the absence of specific recognition, the binding is accomplished via a facilitated chemical reaction between nucleotides and amino acids. In some embodiments, nucleic acids are attached directly to proteins via irradiation. In some embodiments, UV irradiation (e.g., at or about wavelengths of 250 nm) produces a photoaddition between thymidine and ε-amino group of lysine. See Saito I. and Matsuura T. (1985) *Chemical aspects of UV-induced crosslinking of proteins to nucleic acids. Photoreactions with lysine and tryptophan*, Acc. Chem. Res., 1985, 18 (5), pp 134-141. In some embodiments, the anchor oligonucleotide comprises photoactivatable nucleotides that allow for high efficiency crosslinking with lasers emitting a variety of wavelengths. Hafner, M., et al. (2010) *Transcriptome-wide*

*Identification of RNA-Binding Protein and MicroRNA Target Sites by PAR-CLIP*, Cell 141-129. In some embodiments, the anchor oligonucleotide comprises one or more photoactivatable nucleotide having a modified base selected from 4-thiouridine, 5-bromouridine, 5-iodouridine and 6-thioguanosine.

The invention includes the use of a code composed of subcodes. In some embodiments, subcodes are nucleic acids. The invention provides a library of synthetic nucleic acid subcodes each having a unique sequence distinguishable from other subcodes. A subcode is a sequence that does not form a stable bond with any nucleic acid sequence in the tissue sample. For that reason, in some embodiments, the subcode sequence is selected for being free of complementarity to any region of the genome of interest, e.g., the genome of the organism from which the tissue sample is derived or the genome of a target infectious agent for whose presence the tissue sample is being interrogated.

After the first subcode is attached to an anchor, one or more additional subcodes are joined together in an ordered manner to form a code attached to the anchor. The one or more steps of adding subcodes to the code comprises the steps of masking and crosslinking to mark the spatial position of the subcode. As described herein, the attaching step comprises a weak binding followed by crosslinking in the unmasked portion and washing away of the non-crosslinked subcodes in the masked portion.

In some embodiments, the annealing primer hybridizes and is crosslinked to two oligonucleotide subcodes in each round allowing the subcodes to be connected and then joined by ligation. Enzymatic ligation may utilize a DNA ligase or an RNA ligase, for example T4 DNA ligase, T4 RNA ligase, *Thermus thermophilus* (Tth) ligase, *Thermus aquaticus* (Taq) DNA ligase, or *Pyrococcus furiosus* (Pfu) ligase. Non-enzymatic or chemical ligation may utilize activating and reducing agents such as carbodiimide, cyanogen bromide (BrCN), imidazole, 1-methylimidazole/carbodiimide/cystamine, N-cyanoimidazole, dithiothreitol (DTT) and ultraviolet light.

In other embodiments, the subcodes are linked together using CLICK chemistry. (El-Sagheer et al. (PNAS, 108:28, 11338-11343, 2011).

In some embodiments, binding to the annealing primer leaves a gap of one or more nucleotides between the subcodes requiring a fill-in by a nucleic acid polymerase prior to ligation. In some embodiments, a phosphorylation step is carried out prior to ligation. In some embodiments, the polymerase is an error-prone or low fidelity DNA polymerase. The error-prone polymerase incorporates nucleotide variations (errors) that vary among codes and comprise additional diversity among the codes. In some embodiments, the polymerase is a Y-family DNA polymerase described in Ohmori et al. (2001) *The Y-family of DNA polymerases*, Mol. Cell 8: 7-8. The Y-family polymerases are characterized by lack of detectable 3'→5' proofreading exonuclease activity, and replicate undamaged DNA in vitro with low fidelity and weak processivity. In some embodiments, the polymerase is a bacterial, or an archaeal or a eukaryotic error prone polymerase. In some embodiments, the polymerase is Taq polymerase. In some embodiments, fidelity of Taq polymerase is further decreased by the presence of $Mn^{2+}$ or by increased concertation of $Mg^{2+}$ ions.

Figure 5:
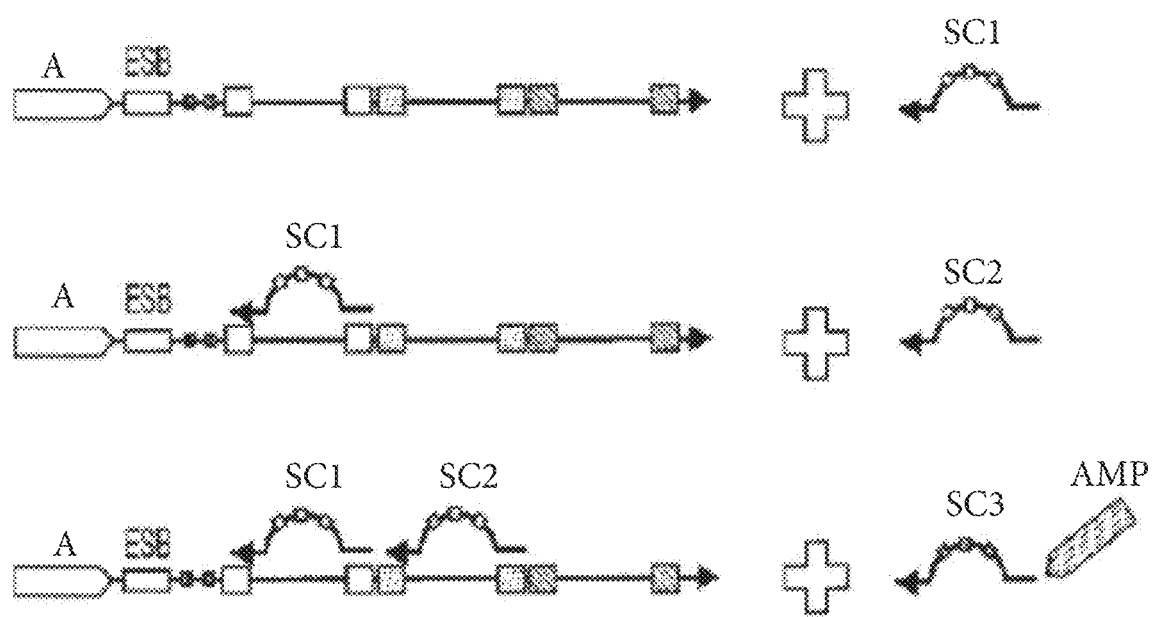
FIG. 5 illustrates a method of assembling codes from subcodes using a splint.

In some embodiments, subcodes are added to a splint oligonucleotide connected to the anchor (FIG. 5). The splint is connected to an anchor (A) and optionally, to the epitope-specific barcode (ESB). The splint comprises landing pads (large open squares) for subcode (SC) annealing. Because subcodes have different sequences, there is no annealing of the entire subcode to the splint. Subcodes have one or more unique sequences (small open squares). After the annealing step, the crosslinking step and the wash step described herein, the subcodes are linked by ligation or CLICK chemistry as described herein. In some embodiments, prior to being linked, the subcodes need to be extended by a nucleic acid polymerase. In some embodiments, the polymerase is an error prone polymerase that generates additional diversity within the codes. In some embodiments, the last subcode is attached to an amplification primer binding site (AMP).

In some embodiments, subcodes are non-nucleic acid entities. Any chemical moieties that can be linked to each other in an ordered manner by electromagnetic radiation are within the scope of the invention. The electromagnetic radiation includes microwave, terahertz, X-rays and gamma rays. In some embodiments, sonic waves are used. In some embodiments, sonic waves are used to facilitate monomer to polymer conversion, e.g., via heat generation. In some embodiments, the subcodes are assembled into a linear polymer code. In other embodiments, the subcodes assemble into a branch polymer code.

Examples of non-nucleotide subcodes include sugar entities, small definable organics with side groups of distinguishing mass, monomer subunits of any of several different well understood polymers. Any small organic moiety (subunit) where the bonds between the subunits are more easily broken than the bonds within the subunit can be used as a subcode. While it is possible to work with monomers that do not have this latter feature, the efficiency is increased when the inter-subunit monomers are more readily rendered from each other than decomposed in the mass spectrometry process. The monomer to polymer connection process is carried out through photon based accelerated bond formation.

In some embodiments, anchors and subcodes freely diffuse throughout the tissue sample. In other embodiments, one or both of anchors and subcodes are introduced into the tissue sample with the use of an electric field.

In some embodiments, attaching anchors to the targets, attaching subcodes to anchors or subcodes to each other involves crosslinking following the hybridization. In some embodiments, hybridization enables to locate the anchor to a target but is not sufficient to form a bond, e.g., a bond that can withstand a stringent wash. In some embodiments, after a hybridization step and a crosslinking step (described herein below), the anchors or subcodes that were merely hybridized but not crosslinked and any unhybridized anchors of subcodes are washed away in a wash step. In some embodiments, the wash step comprises contacting the sample with a wash buffer comprising one or more of a salt buffer, e.g., saline sodium citrate (SSC), a detergent, e.g., SDS and an aprotic solvent, e.g., DMSO.

In some embodiments, attachment of anchors to the tissue sample, attachment of subcodes to anchors or attachment of subcodes to subcodes in an existing code utilizes photo-reactive groups. In some embodiments, more than one photo-reactive group is used, each group reactive to a unique wavelength, including a photobeam, a terahertz-frequency beam and X-rays. In some embodiments, attachment is by irradiation with sonic waves wherein the sonic waves facilitate a chemical reaction between reactive groups.

In some embodiments, an LED light source can be used. For example, a light source emitting a suitable wavelength light (e.g., 365 nm (XeLED-Ni1UV-R3-365, *Xenopus* Electronix)) can be used to irradiate the tissue. The irradiation can be for an experimentally determined to be suitable duration and distance e.g., from 2 cm for 30 seconds. The non-irradiated portion of the tissue can be blocked, e.g., with aluminum foil or any other light-blocking material. In some embodiments, UV light emitted by a metal-halide lamp (X-Cite, Lumen Dynamics) passed through a 20× microscope objective can be used. The UV energy can range from 50-10 mW for ten seconds to one minute depending on the chemical bond to be formed.

In some embodiments, a mass spectrometry-based measurement system the sequence of the polymer protein attachment point is determined via mass spectrometry-based sequencing.

In some embodiments, crosslinking is photo crosslinking. Photo crosslinking can be accomplished using lasers of a certain wavelength. In embodiments where the anchor comprises a reactive group that reacts with the target in the presence of laser irradiation, multiple anchors are attached to multiple targets utilizing different reactive groups reacting in the presence of irradiation by light of different wavelengths.

In some embodiments, portions of the tissue sample are segregated by masking. A portion of the tissue sample masked while subcodes are being attached to the remaining (unmasked) tissue sample. Masking can be accomplished via standard masking systems used in photolithography. Virtual masking or photolithography can be carried out via addressable laser systems that are well established in the technical communities.

In some embodiments, laser light is directed by a maskless method utilizing a digital micromirror device (DMD) Singh-Gasson et al., (1999) *Maskless fabrication of light-directed oligonucleotide microarrays using a digital micromirror array*, Nature Biotechnology 17:974. In this embodiment, the tissue sample forms an addressable array where subcodes are crosslinked to addressable areas in the 2D sample.

In some embodiments, the method utilizes a laser instrument. The laser confers the advantage of precisely focusing on an area of the tissue sample so that the barcoded could be precisely associated with the area and not have seepage experienced by the prior art methods. A typical laser available in the art is capable of a micron-level resolution enabling one to distinguish up to 1,000,000 to 2,500,000 spots on a microscope slide.

In some embodiments, the laser is a programmable laser. Using a programmable laser, the tissue sample could be made into a virtual addressable array. In the array, each position is correlated by the programmable laser to the timing of irradiation of that position and to the sequence of the subcode code being added (crosslinked) to the code at that time. Subsequent analysis of the nucleic acid sequence of the barcode reveals the chain of subcodes that is translated into the barcode's position within the virtual addressable array formed by the programmable laser on the tissue sample.

Furthermore, each barcode is directly or indirectly associated with a target-specific sequence. In one embodiment, the barcode is assembled directly on the anchor that is complementary to the target which is a nucleic acid. In this embodiment, sequencing the barcodes also comprises sequencing of the target nucleic acid. In another embodiment, the target which is a protein is recognized by an antibody associated with an epitope-specific barcode (ESB). ESB is a nucleic acid sequence associated with a target-specific antibody. In this embodiment, sequencing the barcode also comprises sequencing the ESB which is virtually associated with the target protein. Thus the use of the addressable array in which barcodes are positioned enables determining coordinates of each barcoded target within the array and within the tissue sample.

Figure 2:
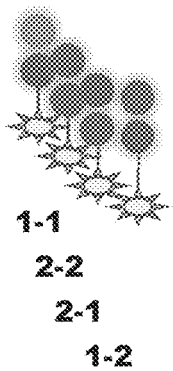
FIG. 2 illustrates sequential assembly of spatial codes in situ in the tissue sample.
Figure 2:
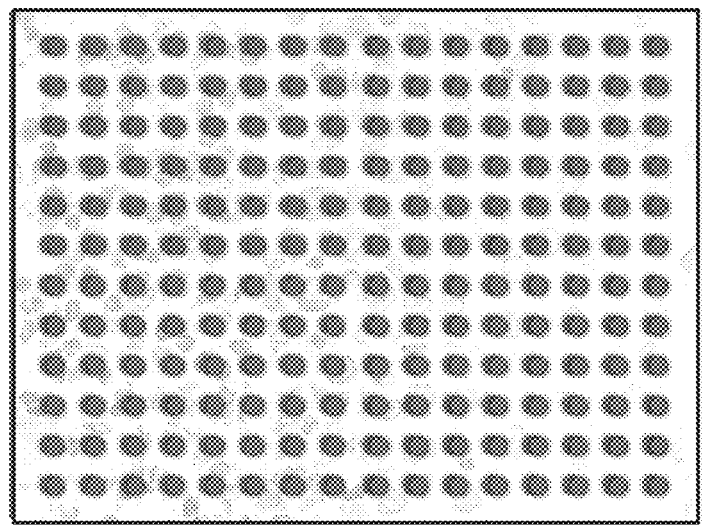
Figure 2:
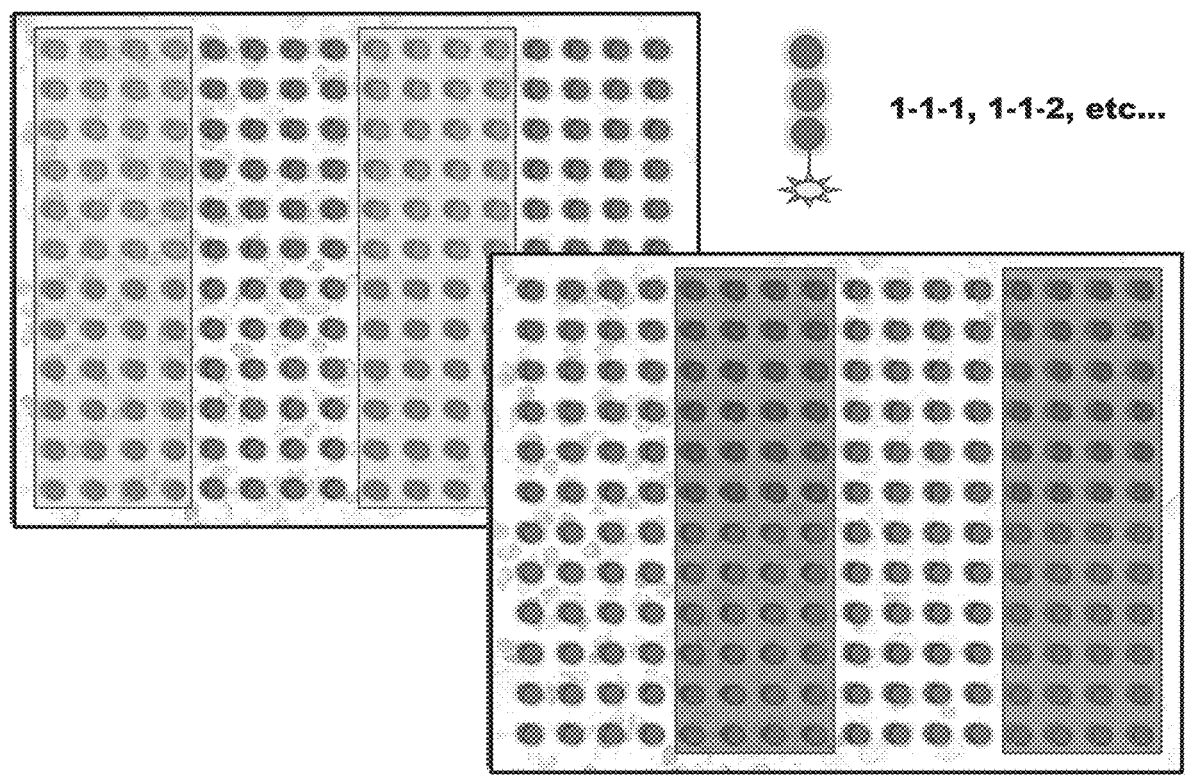

The code is correlated with a position in the tissue sample. The codes are attached to the targets in each portion of the tissue sample in a time-ordered fashion via irradiation by a programmable laser guided by an executable code to correlate the time at which a particular code is attached and the sequence of the code with the portion of the sample processed (e.g., irradiated with a laser) at that time. (FIG. 1: subcode 1 is added first to anchors the "left" half at step 1 and thus marks the left half, then subcode 2 is added first to anchors the "right" half at step 2 and thus marks the right half). The code is assembled from two or more subcodes as described in more details below. FIG. 2 shows a diagram of assembling codes 1-1, 1-2, 2-1 and 2-2 and subsequently, codes 1-1-1, 1-1-2, etc. At the end of the labeling process, every target (e.g., protein or nucleic acid) within the sample is labeled with a code specific for the location of the target within the sample. The assembled code is unique to each portion of the tissue sample and acts as a positional or spatial marker of that portion of the tissue sample. The length of the code reflects the resolution (the size of the smallest distinguishable region) within the sample.

In some embodiments, the code is a nucleic acid and reading the code comprises sequencing the nucleic acid. In some embodiments, the 5'-end of the assembled code is a proximal end attached to the anchor and the 3'-end is a distal end. In other embodiments, the 3'-end of the assembled code is a proximal end attached to the anchor and the 5'-end is a distal end.

In some embodiments, the assembled code comprises a universal domain containing elements for downstream analysis of the code. In some embodiments, the universal domain comprises binding sites for primers, e.g., amplification primers or sequencing primers.

In some embodiments, the code is amplified prior to sequencing. In such embodiments, amplification primers bind to a primer binding site within the assembled code. The primer binding site is the sequence at least partially shared among all subcodes. In some embodiments, the primer binding site is in the distal end of the code (farthest from the target). The distal end may be the 3'-end to which the amplification primer may bind and initiate the first round of amplification. In some embodiments, the primer binding site is in the proximal end of the code (closest to the target). The proximal end may be the 3'-end to which the amplification primer may bind and initiate the first round of amplification. In some embodiments, the amplification uses a primer at least partially complementary to the anchor (the anchor comprises at least a portion of the primer binding site).

In some embodiments, amplification serves as a target recognition step of the method. In some embodiments, every target in the sample (i.e., every protein in the sample) is spatially labeled. Detection of a specific protein target may be accomplished with an antibody. The antibody can be obtained any suitable source including recombinantly expressed antibody and antibody obtained from a variety of animal species. A wide variety of pre-made and custom-made antibodies can be obtained from commercial sources. In some embodiments, the antibody is connected to a nucleic acid. In some embodiments (FIG. 4), both the antibody and an amplification primer are conjugated to the same particle of slid support. In some embodiments, the primer is conjugated directly to the antibody. Any suitable method to attach nucleic acids to proteins including antibodies is encompassed in the methods of the invention, see e.g., Gullberg et al., PNAS 101 (22): 228420-8424 (2004); Boozer et al, Analytical Chemistry, 76(23): 6967-6972 (2004) and Kozlov et al., Biopolymers 5: 73 (5): 621-630 (2004). In some embodiments, the antibody-anchor is attached to a nucleic acid using tadpoles as described in Nolan, Nature Methods 2, 11-12 (2005). In some embodiments, the antibody is conjugated to a nucleic acid using the SpyTag-SpyCatcher technology wherein the antibody and the nucleic acid comprise a SpyTag and SpyCatcher, see Reddington and Howarth (2015) *Secrets of a covalent interaction for biomaterials and Biotechnology, SpyTag and SpyCatcher*, Current Opinion in Chemical Biology 2015, 29:94-99. In yet other embodiments, the primer is directly conjugated to the antibody and is also directly conjugated to a particle of solid support or to a capture moiety (e.g., biotin).

Figure 4:
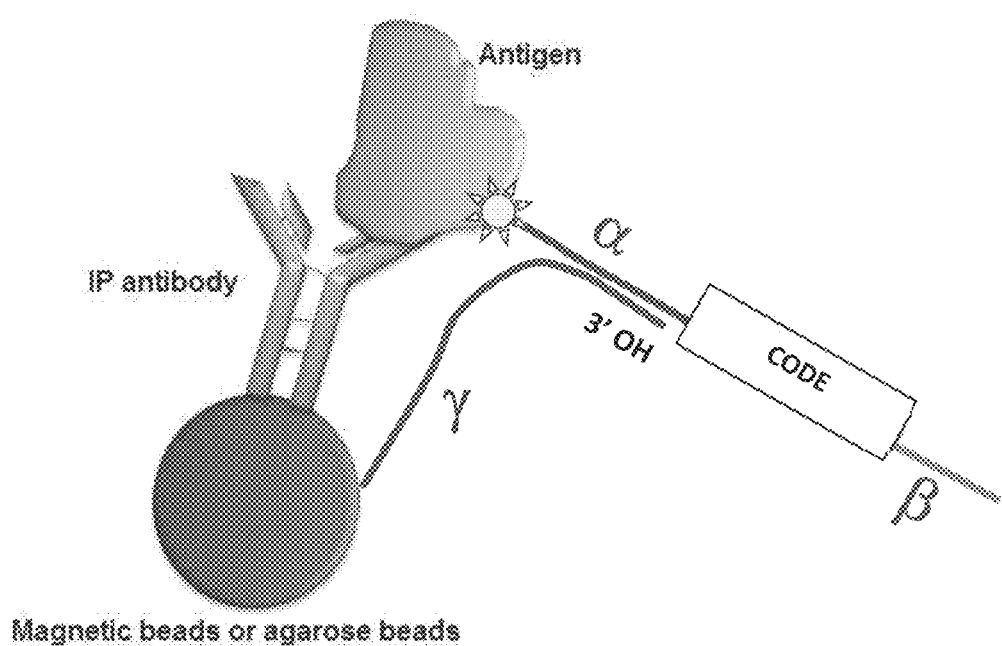
FIG. 4 illustrates detecting a spatially-labeled protein target with an antibody.

The biding of the antibody serves to deliver the amplification primer and enable amplification of the spatial code. Although the code (or the anchor) comprises a primer binding site at least partially complementary to the primer, the complementarity is not sufficient to effect both primer annealing and primer extension. For the primer extension to occur, the antibody must bind to the target (FIG. 4). Without antibody binding, the code is not amplified and is not detected. Therefore, only the spatial code attached to the target of interest is amplified and detected.

The invention comprises a step of reading the codes, the anchors and directly or indirectly, any information about the target by nucleic acid sequencing. The sequencing can be performed by any method known in the art. Especially advantageous is the high-throughput single molecule sequencing capable of reading circular target nucleic acids. Examples of such technologies include the SOLiD platform (ThermoFisher Scientific, Foster City, Cal.), Heliscope fluorescence-based sequencing instrument (Helicos Biosciences, Cambridge, Mass.) Pacific BioSciences platform utilizing the SMRT (Pacific Biosciences, Menlo Park, Cal.) or a platform utilizing nanopore technology such as those manufactured by Oxford Nanopore Technologies (Oxford, UK) or Roche Sequencing Solutions (Roche Genia, Santa Clara, Cal.), via a reversible terminator Sequencing by Synthesis (SBS) (Illumina, San Diego, Cal.) and any other presently existing or future DNA sequencing technology that does or does not involve sequencing by synthesis. The sequencing step may utilize platform-specific sequencing primers. Binding sites for these primers may be introduced into the code for example, by being a part of the final subcode or amplification primers used to amplify the codes prior to sequencing.

In some embodiments, the code is a combination of two or more non-nucleic acid chemical entities and reading of the code comprises analysis by mass-spectrometry via time of flight (TOF) determination. In this embodiment, the encoding is carried out via photon enabled polymerization of subunits. While nucleic acids can be read out via high throughput sequencing, other methods are required to determine the sequence of polymerized or conjugated non-nucleotide chemical moieties. This is a well characterized process in mass spectrometry sequencing of proteins. The process enabled here simply generalizes this to the reading of polymer subunits. The advantage of other polymer subunits is that one might unexpectedly find polymer subunits that are more easily distinguishable by mass spectrometry than amino acid-based polymers.

In some embodiments, the invention comprises simultaneous detection of multiple target molecules (multiplex assay). For example, multiple antibody-anchors may be added to the tissue sample. Likewise, multiple nucleic acid anchors may be added to the tissue sample. The multiple nucleic acid anchors may not share regions of complementarity to prevent in vitro interactions among the anchors. The complementarity including partial complementarity can be ruled out experimentally or with the use of software such as BLAST.

The instant method can detect and distinguish potentially millions of unique positions within a tissue sample. Longer barcodes (having been formed through more rounds of assembly) can distinguish more positions. The use of multiple reactive groups available for crosslinking allows to distinguish even more positions within the tissue sample. For each reactive group, the intensity may vary thus effectively splitting each set into up to three separate sets. The following calculations enable one skilled in the art to determine the number of barcodes (and rounds of code assembly) needed to achieve desired spatial resolution within a given tissue sample.

If 5 different wavelengths are used, in a single round, the number of positions distinguished in 3D is $5^3=125$. If two rounds of code assembly are used, the number of positions distinguished in 3D is $125^2=15,725$. For three rounds, the number of positions is $125^3=1.95\times10^6$. If 5 different wavelengths are used where each has up to 3 distinguishable intensities, in a single round, the number of positions distinguished in 3D is $(5\times3)^3=3,375$. If two rounds of assembly are used, the number of positions distinguished in 3D is $3,375^2=1.1\times10^7$. For three rounds, the number of positions is $3,375^3=3.84\times10^{10}$. A typical cell has a volume of $10^3$ cubic microns. An exemplary 1 mm$^3$ tissue section comprises $10^9$ distinguishable cells. For this example, two or three rounds of code assembly may be sufficient to get resolution at the cellular level.

The invention comprises a step of correlating the code sequence to the portion of the tissue sample in order to obtain a location of the target within the tissue sample. In some embodiments, the tissue sample is oriented to enable maximum information content retrieval from areas of the tissue that are most of the interest to the researcher. The tissue would be oriented within a gel matrix that allows for laser addressing and interrogation of the sample. In some embodiments, the tissue sample is marked with positional markers. For instance, positional (fiduciary) markers can be introduced via beads conjugated to known nucleic acid codes. The codes serve as preprogrammed addresses. The markers can be introduced either by hand or by robotic placements. In other embodiments, such positional markers can be introduced via targeting a known sequence with a complementary probe also comprising a known nucleic acid code. Crosslinking the code to a known spot in the sample creates a positional marker.

In the context of the invention, positional information about a particular code is obtained from the time at which the portion of the sample was subject to irradiation resulting in attachment of the code to the sample. (FIG. 2)

In some embodiments, the invention is a method of simultaneously detecting the presence and spatial location of a target in a three-dimensional or two-dimensional sample. The tissue sample could be a 2D or 3D eukaryotic (animal, human, plant or fungal) tissue sample (e.g., on a microscope slide) or a prokaryotic sample such as a microbial biofilm having a 2D or 3D structure. The sample needs to be transparent or rendered transparent so as to be addressable by the laser system used in the invention.

In the first step, the sample is contacted with an anchor that attaches to a target in the tissue sample. The target can be a protein or a nucleic acid (RNA or DNA). Accordingly, the anchor is a nucleic acid probe, a non-specific nucleic acid or a protein-specific nucleic acid aptamer. In some embodiments, the anchor binds one target with specificity (e.g., an aptamer, a nucleic acid probe or an antibody). In other embodiments, the anchor binds multiple targets non-specifically. Binding conditions for aptamers have been described e.g., in Deng, et al., (2014) *Aptamer binding assays for proteins: The thrombin example—A review*, Analytica Chim. Acta, 837:11-15. Binding conditions for nucleic acid probes are those used in in-situ hybridization (ISH), see Wilkinson, E. G., ed. (1999) In Situ Hybridization: A Practical Approach (Practical Approach Series) 2nd Edition, Oxford University Press.

The anchor comprises a reactive group, e.g., a photoactive or another type of group that can be activated by radiation. The anchor is crosslinked to the target via irradiation having the wavelength that activates the reactive group.

Figure 3:
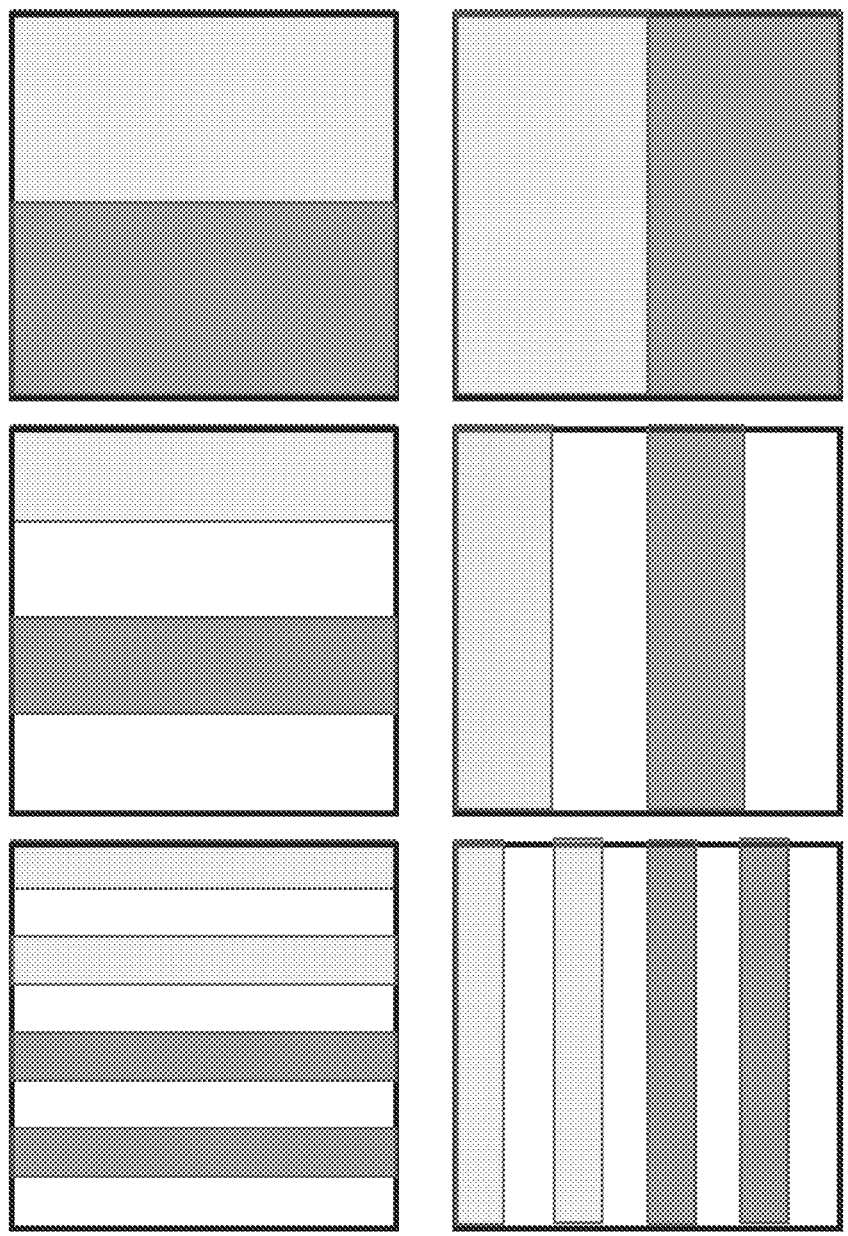
FIG. 3 illustrates the process of forming unique addresses within the sample.

The anchor serves as a site for assembly of a code. The code is assembled in situ on each anchor molecule. The code is assembled from two or more subcodes via two or more rounds of assembly. Assembly involves binding and crosslinking of subcodes followed by removal (wash) of unlinked subcodes. During each round of assembly, a part of the tissue sample is masked so that crosslinking does not occur in the masked part. (FIG. 1). The sample is contacted with a first subcode (e.g., 1) allowing the subcode 1 to attach to the anchor in a first portion of the tissue sample. The second portion is masked. Next, the sample is contacted with the second subcode (e.g., 2) allowing the subcode 2 to attach to the anchor in a second portion of the tissue sample non-overlapping with the first portion. (FIG. 1). The first portion is now masked. For example, the first and second portion could be left and right halves of a microscope slide. In the next round, the sample is contacted with the next subcode (e.g., 1 or 2) allowing the subcode to attach to the subcodes A and B in a third portion of the tissue sample partially overlapping with the first and second portion, forming two-part codes (e.g., 11 and 21) thereon (FIG. 2). The fourth portion is masked. Next, the sample is contacted with the next subcode (e.g., 1 or 2) allowing the subcode to attach to the subcodes 1 and 2 in a fourth portion of the tissue sample partially overlapping with the first and second portions but non-overlapping with the third portion, forming two-part codes (12 and 22) thereon. The third portion is masked. For example, the third and fourth portion can be the top and bottom halves of a microscope slide. Thereby the tissue sample is divided into four areas, each with a unique address. Optionally the steps can be repeated so that more subcodes can be added and the tissue sample can be further divided into areas, each area having a unique address marked by a unique code (i.e., a unique combination of subcodes). For example, in subsequent steps, portions of the sample are exposed and masked to enable subcode addition creating longer code (e.g., 111, 211, 112, 212, etc.) each corresponding to a smaller portion of the sample. (FIGS. 2-3). The assembled codes are read to determine the spatial location of each anchor in the tissue sample.

FIG. 1 illustrates a workflow for detecting the presence and location of targets in a tissue sample. In this example, the anchor is conjugated to the first subcode. The anchor comprises a reactive group (a photoreactive group in this illustration) so that the anchor can be crosslinked to the target. A tissue sample in the form of a tissue slide is contacted with an anchor molecule ($\alpha$) conjugated to a reactive group such that each target in the tissue sample (e.g., each protein) is decorated with the anchor molecule.

Subcode can attach to each other (i.e., to the subcode from the previous round) via a region of complementarity to the other subcodes. In some embodiments, subcodes do not anneal to each other but to an annealing primer to which both adjacent subcodes anneal. In other embodiments, the subcodes anneal to a splint oligo. However, in every embodiment, crosslinking is required to form a stable bond between the two subcodes, the subcodes an annealing primer or subcodes and splint. Uncrosslinked subcodes are washed away in the wash step.

FIG. 2 illustrates sequential assembly of spatial codes in situ in the tissue sample. In each round, a portion of the slide is masked while in the remaining active portion, the next subcode molecule is added. As shown, the masked portion and the active portion are not contiguous. As illustrated, at each address, a code consisting of 2 and then 3 subcodes is assembled. The attaching of nucleic acid subcodes may comprise one or more of nucleic acid strand extension, gap fill-in and ligation. For example, if an annealing primer is used, the nucleic acid ends may anneal directly adjacent to each other enabling a ligation of the 5'-end and a 3'-end of the adjacent nucleic acids, e.g., subcodes. In other embodiments, there is a gap between the ends of the nucleic acids. The gap is filled by strand extension by a nucleic acid polymerase. The 3'-end of the extended strand is ligated to the 5'-end of the adjacent nucleic acid, e.g., subcode.

In some embodiments, the anchor binds to targets non-specifically. For example, every protein in the sample may be bound to an oligonucleotide anchor via nucleotide-amino acid crosslinking. Detecting proteins of interest in this setting requires a separate detection step. For example, the anchor-conjugated protein target may be detected with an antibody. The antibody is conjugated to a nucleic acid that interacts with the code assembled on a target molecule (anchor-conjugated protein) so that the target molecule is detected. As illustrated in FIG. 4, the antibody is conjugated to an extendable oligonucleotide ($\gamma$) complementary to the anchor region ($\alpha$). Extension of the oligonucleotide enables copying or copying and amplification of the code (bar region). Copying and amplification occur only if the antibody binds to its target ensuring specificity of the detection. Binding conditions for antibodies are those applied in the staining of tissues with antibodies in either flow cytometry, or immunohistochemistry, see S. Hockfield et al., Selected Methods for Antibody and Nucleic Acid Probes, Cold Spring Harbor Lab Press (1993). In some embodiments, the detection is qualitative so that the presence of the amplicon indicated presence of the target. In some embodiments, the detection is quantitative, e.g., the number of different unique barcodes amplified indicates the number of cells in the tissue sample that comprise (express) the target protein. In some embodiments, the detection is quantitative, e.g., the amount of the amplicon with the same barcode indicates the amount (level of expression) of the target protein in a particular cell in the tissue sample.

While the invention has been described in detail with reference to specific examples, it will be apparent to one skilled in the art that various modifications can be made within the scope of this invention. Thus the scope of the invention should not be limited by the examples described herein, but by the claims presented below.

I claim:

1. A method of simultaneously detecting the presence and spatial location of target molecules in a tissue sample, the method comprising:

(a) covalently attaching anchors to target molecules the tissue sample via a reactive group;

(b) on the anchors, assembling codes from a set of subcodes by a method comprising:
  (i) contacting the sample with a first subcode and allowing the first subcode to covalently attach to the anchors in a first area of the tissue sample;
  (ii) contacting the sample with a second subcode and allowing the second subcode to covalently attach to the anchors in a second area of the tissue sample non-overlapping with the first area;
  (iii) repeating the pair of steps (i)-(ii) one or more times, wherein:
    in each repetition, the area of the tissue sample contacted in the first step is non-overlapping with the area of the tissue sample contacted in the second step;
    the subcodes used in consecutive repetitions are different; and
    the added subcodes attach to the existing subcodes and extend the existing code to produce codes marking each area of the tissue sample; and
(c) reading the codes assembled on the anchors in step (iii) thereby detecting the presence of the target molecules and their locations in the tissue sample.

2. The method of claim 1, wherein the subcodes are nucleic acids.

3. The method of claim 2, wherein the anchors are covalently attached to the target molecules via crosslinking.

4. The method of claim 3, wherein prior to covalently attaching the first and second subcodes to the anchors, the subcodes hybridize to the anchors and to the other subcodes via regions of complementarity to the anchors and the other subcodes.

5. The method of claim 3, wherein the subcodes are covalently attached to the anchors and other subcodes via crosslinking.

6. The method of claim 3, wherein the subcodes attach to the anchors and the other subcodes via sonic irradiation that facilitates a chemical reaction.

7. The method of claim 1, wherein the target molecules are a protein.

8. The method of claim 7, wherein the reactive group in the anchors is thymidine attached to the protein via thymidine-lysine addition.

9. The method of claim 1, wherein subcodes in step (ii) attach to a common linker.

10. The method of claim 1, wherein subcodes in step (ii) attach to existing subcodes via an annealing primer.

11. The method of claim 1, wherein subcodes are covalently linked by ligation.

12. The method of claim 11, wherein ligation is preceded by strand extension by a polymerase.

13. The method of claim 1, wherein reading the code in step (c) comprises amplifying the code.

14. The method of claim 1, wherein reading the code in step (c) comprises sequencing the code.

15. The method of claim 1, wherein reading the code in step (c) comprises binding of a specific antibody to the target molecules.

16. The method of claim 15, wherein the antibody is connected to a primer for reading the code.

17. The method of claim 16, wherein the antibody and the primer are connected by virtue of being attached to the same solid support.

18. The method of claim 1, wherein reading the code in step (c) utilizes a primer at least partially complementary to the anchors.

19. The method of claim 1, wherein reading the code in step (c) utilizes a primer that is at least partially complementary to the last subcode added in step (b).

20. The method of claim 1, wherein the anchors are an aptamer.

21. The method of claim 1, wherein multiple anchors comprising different reactive groups are attached to the tissue sample.

22. The method of claim 1, wherein the anchors comprises a reactive group that reacts with the target molecules in the presence of electric field.

23. The method of claim 1, wherein the subcodes comprise non-nucleotide entities and the codes are read by mass-spectrometry.

24. The method of claim 1, wherein covalently attaching the subcode to the area of the tissue sample comprises a step of masking the remainder of the tissue sample.

* * * * *